April 27, 1943.                P. WOLFERS                2,317,349
                                HANDLE
                          Filed Oct. 11, 1940
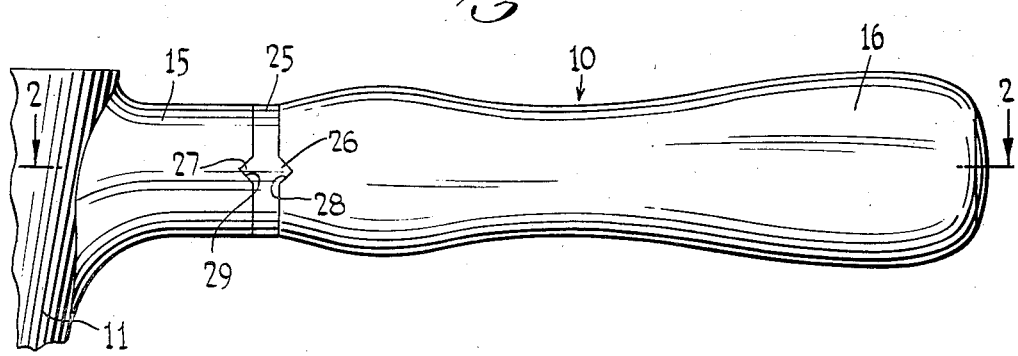
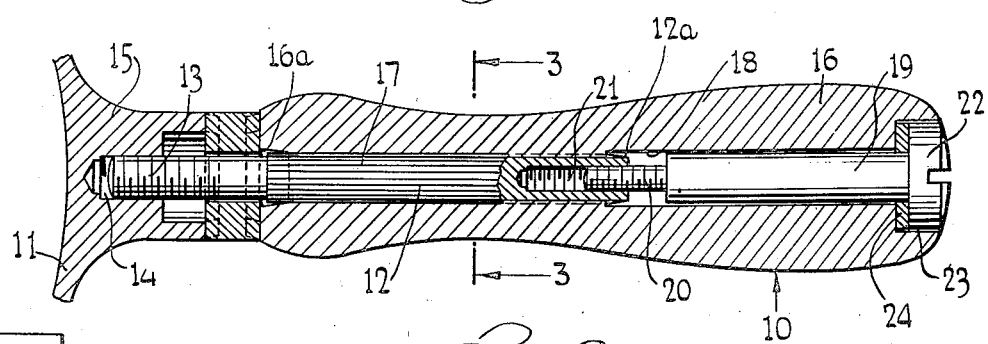
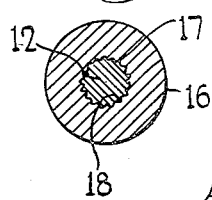
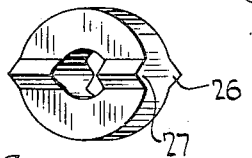
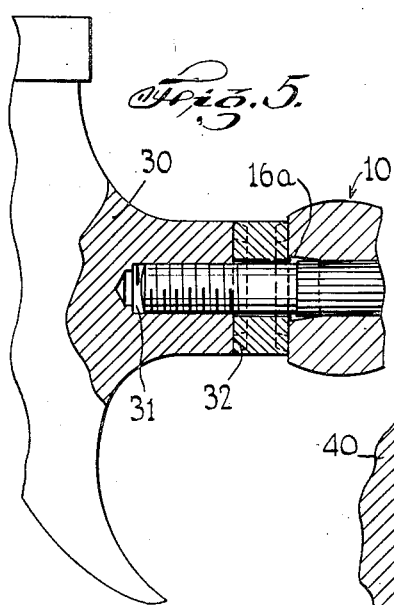
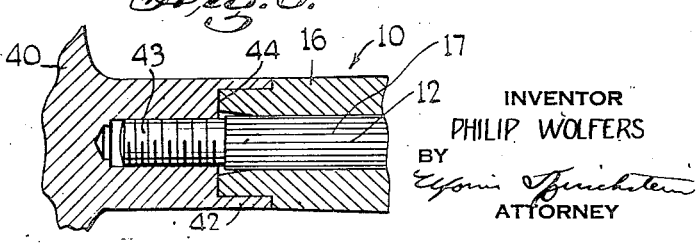
INVENTOR
PHILIP WOLFERS
BY
ATTORNEY Patented Apr. 27, 1943

2,317,349

UNITED STATES PATENT OFFICE 2,317,349

HANDLE

Philip Wolfers, New York, N. Y., assignor of one-fourth to I. Newton Brozan, Aaron Holman, and J. Stanley Halperin, jointly, all of New York, N. Y.

Application October 11, 1940, Serial No. 360,694

2 Claims. (Cl. 16—114)

This invention relates to handles.

Generally, the object of my invention is to provide a handle which is immovably locked to the object to which it is attached.

It is also an object of my invention to provide a handle whose parts cannot be so manipulated as to distort the object to which it is attached.

A further object is to provide a handle of the character described which is economical to manufacture, easy to attach or replace, and highly efficient for all purposes.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawing, in which are shown several of the various possible embodiments of this invention, Fig. 1 is a side view of a handle embodying my invention attached to a skillet;

Fig. 2 is a sectional view taken along the line 2—2 of Fig. 1;

Fig. 3 is a sectional view taken along the line 3—3 of Fig. 2;

Fig. 4 is a perspective view of a specially shaped washer employed in my handle; and Figs. 5 and 6 are sectional views of modified forms of the invention showing my handle attached to a tool.

Referring now in detail to the drawing, and more particularly to Figs. 1 through 4, 10 is a handle embodying my invention, attached for illustration to a skillet 11. The handle comprises a shank 12 having an exteriorly threaded end 13 which is received in a tapped hole 14 disposed at the bottom of a recessed handle lug or socket 15 provided on the skillet 11. A gripping member 16 of durable, heat insulating material, such as wood, is disposed about the shank 12, said shank and handle being so fashioned that the handle is non-rotatably and non-shiftably held to the shank. For this purpose, the exterior of the shank may be formed with a plurality of splines 17 and the gripping member provided with a bore 18 having a constricted portion of slightly less diameter than the splined portion of the shank 12. Thus, when the gripping member 16 is forced on the splined portion of the shank 12, the splines 17 will frictionally engage and tightly hold the said gripping member.

To aid in preventing the gripping member 16 from sliding off the shank 12, I also provide a tightening bolt 19 having a long threaded rod 20 which engages a deep tapped hole 21 in the shank 12. The head 22 of the bolt 19 lies in a recess 23 provided for this purpose at the outer end of the handle. A washer 24 may be interposed between the head of the bolt 19 and the base of the recess 23 in order to prevent deformation of this part of the handle in the event that the bolt 19 is excessively tightened.

Means is also provided to prevent rotation of the shank and handle relative to the skillet 11. Such means may comprise a washer 25 having a plurality of oppositely disposed ridges 26 and 27 which fit into mating grooves 28 and 29, respectively, in the gripping member 16 and lug 15. If desired, in order to further insulate the handle, the washer 25 may be fabricated from any suitable heat insulating material such as a phenol condensate.

The handle 10 may be attached to the skillet 11 by first threading the end 13 of the shank into the tapped hole 14 but without fully tightening said shank into the hole. The washer 25 is then run down over the shank and one set of ridges 27 is fitted into the corresponding grooves in the lug 15. The grooves 28 in the gripping member 16 are next approximately aligned with the ridges 26 on the washer 25, and the gripping member then forced down over the splines 17 until it abuts the washer. In order to facilitate this operation and to prevent splitting of the gripping member 16, the leading edges 12a of the splined portion of the shank may be slightly chamfered and the leading edges 16a of the gripping member slightly broached.

If the grooves 28 at this time do not exactly meet the ridges 26 on the washer 25, the gripping member 16, together with the shank 12, may be turned slightly to allow the ridges and grooves to mate. Finally, the tightening bolt 22 is inserted into the bore 18 and the bolt screwed home into the tapped hole 21, firmly forcing the gripping member 16 into abutment with the washer 25 and the washer 25, in turn, into abutment with the lug 15.

It will thus be seen that the gripping member 16 is non-rotatably held with respect to the skillet 11 by means of the washer 25, and the shank 12 non-rotatably held with respect to said skillet by means of the splines 17, gripping member 16 and washer 25. In this manner, I have provided a handle construction which enables the gripping member to be rigidly and non-shiftably held to an article without exerting any undue turning effort on any of the various parts comprising the handle. Also, if any such undue effort should be applied to the bolt 19, this force would not be transmitted to the tapped hole 14 in the handle lug as is usual in utensil handles, to thereby distort that portion of the utensil or increase the depth of the tapped hole to such an extent that the shank projects into the interior of the skillet.

It should be noted that I have provided an unusually deep tapped hole 21 in the shank 12 and a long threaded portion 20 on the bolt 19 in order to enable a single shank to be employed with gripping members 16 of varied length without requiring a change in the size of such shank and bolt. Also, by employing a shank and bolt fashioned in this manner, I am able to take up any shrinkage which may occur in the gripping member 16 during use and to maintain said gripping member pressed against the washer 25. It should be noted, however, that during ordinary usage, when the gripping member 16 has once been forced down over the splined portion of the shank 12 and into abutment with the washer 25, due to the tight engagement of the constricted portion of the bore 18 with the said splined portion, said gripping member will not easily come loose.

In the modified form of my invention shown in Fig. 5, my improved handle 10 is attached to a hammer head 30 which is provided, in order to receive said handle, with a tapped hole 31 and grooves 32 similar to the hole 14 and grooves 29 in the lug 15.

In the embodiment of my invention set forth in Fig. 6, I have shown another means for preventing rotation of the gripping member 16 and shank 12 relative to a tool 40 to which the handle 10 is attached. Such means may comprise the provision of a square upstanding flanged portion 42 disposed about the tapped hole 43 in which the shank 12 is threaded, and a mating squared end 44 on the gripping member 16.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A handle adapted to be detachably locked to an article having a threaded handle receiving portion, said handle comprising a shank having a threaded end adapted to engage the threaded handle receiving portion of said article, a gripping member mounted on said shank, and means to releasably lock said shank against rotation relative to said article, said means comprising means to restrain said gripping member from rotating and shifting axially relative to said shank, and means to restrain said gripping member from rotating relative to said article.

2. A handle adapted to be detachably locked to an article having a threaded handle receiving portion and comprising a shank having a threaded end adapted to engage the threaded handle receiving portion of said article, a gripping member mounted on said shank, and means to releasably lock said shank against rotation relative to said article, said means comprising means to restrain said gripping member from rotation and shifting axially relative to said shank, said means for restraining shifting of said gripping member relative to said shank being so constructed and arranged as to be capable of being rendered ineffective by manual manipulation, and means interposed between said gripping member and said article to restrain said gripping member from rotating relative to said article.

PHILIP WOLFERS.